United States Patent [19]

Ryan

[11] 4,344,179
[45] Aug. 10, 1982

[54] CLOCK SYNCHRONIZER AND DATA DETECTOR

[75] Inventor: Carl R. Ryan, Gilbert, Ariz.

[73] Assignee: Motorola Inc., Schaumburg, Ill.

[21] Appl. No.: 205,063

[22] Filed: Nov. 7, 1980

[51] Int. Cl.³ .............................................. H04L 7/02
[52] U.S. Cl. .................................. 375/110; 375/119; 328/63; 328/155
[58] Field of Search ............... 375/106, 110, 111, 118, 375/119; 328/63, 72, 155, 179; 370/100

[56] References Cited

U.S. PATENT DOCUMENTS 3,993,956 11/1976 Gilmore et al. ...................... 375/118
4,039,748 8/1977 Caron et al. ......................... 375/118
4,249,252 2/1981 Holmeister .......................... 375/106
4,298,986 11/1981 Hughes .............................. 375/119

Primary Examiner—Jin F. Ng
Attorney, Agent, or Firm—Eugene A. Parsons

[57] ABSTRACT

A stream of demodulated data is converted to unidirectional pulses, multiplied by two clock reference signals separated by 90 degrees to form two products, which products are low pass filtered and cross multiplied by the same two clock reference signals, and the products produced are summed together to provide a clock reference which is in-phase with the switching times of the data pulses. The in-phase clock pulses operate a sampling circuit to sample the data at each switching point.

10 Claims, 1 Drawing Figure

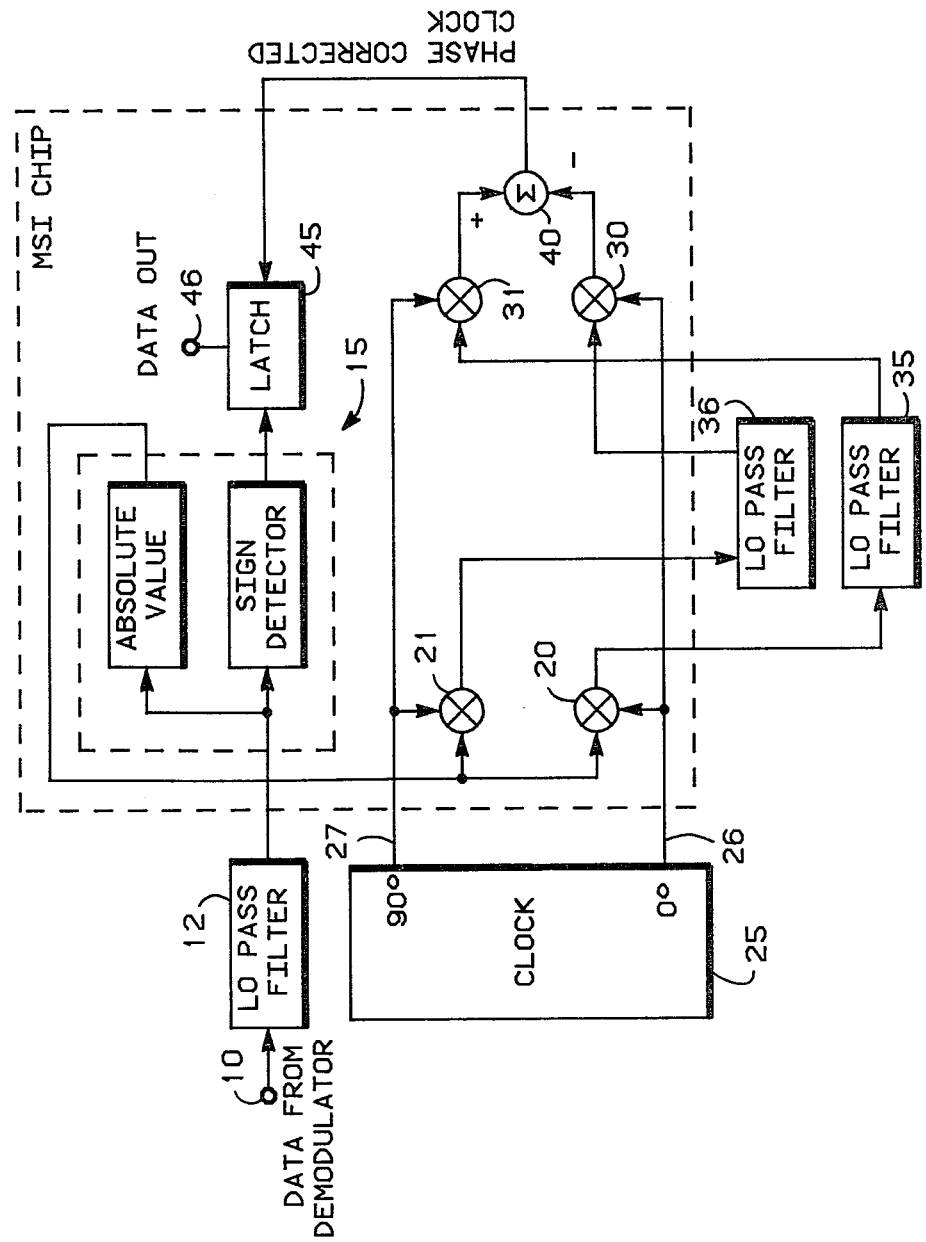

CLOCK SYNCHRONIZER AND DATA DETECTOR

BACKGROUND OF THE INVENTION

In the detection of streams of data supplied by a demodulator, such as that disclosed in the copending application Ser. No. 204,743 entitled "Rapid Acquisition Carrier Demodultor", filed of even date herewith, and having the same inventor and assignee, the data can be reconstructed into an accurate representation of the original data by sampling the received demodulated stream of data at the switching points. "The switching points" is herein defined as the points of time in the data stream at which the circuits producing the data stream were clocked. However, to perform this sampling function it is necessary to provide a stream of clock pulses at the frequency of the original clock pulses and in a consistent, known phase with the switching of the original data. Thus, this synchronized stream of clock pulses will be in a consistent, known phase with the original stream of clock pulses which produced the original stream of data. By samping the demodulated stream of data in response to the synchronized stream of clock pulses, the demodulated stream of data can be reconstructed into a stream of "1's" and "0's" substantially equal to the original stream of data.

SUMMARY OF THE INVENTION

The present invention pertains to a clock synchronizer and data detector including a source of reference signals separated in phase by a predetermined number of electrical degrees, first multiplying means connected to multiply a received stream of data by each of the reference signals to provide first and second products, low pass filter means connected to receive the products and substantially reduce the noise content therein, second multiplying means for multiplying the first filtered product by the second reference signal and the second filtered product by the first reference signal, combining means connected to combine the outputs from the second multiplying means into a single stream of clock pulses having a predetermined phase relationship with respect to the switching points of the stream of data, and sampling means sampling the stream of data approximately at each of the switching points in response to the stream of clock pulses.

It is an object of the present invention to provide new and improved clock synchronizer and data detector circuitry.

It is a further object of the present invention to provide a new and improved clock synchronizer and data detector circuitry incorporating a feed forward phase correction for rapid acquisition.

These and other objects of this invention will become apparent to those skilled in the art upon consideration of the accompanying specification, claims and drawing.

BRIEF DESCRIPTION OF THE DRAWING

The single FIGURE is a simplified block diagram of a clock synchronizer and data detector embodying the present invention.

DESCRIPTION OF THE PREFERRED EMBODIMENT

Referring to the FIGURE, the numeral 10 designates an input terminal adapted to receive demodulated data from a demodulator, such as that described in a copending application Ser. No. 204,743 filed of even date herewith, entitled "Rapid Acquisition Carrier Demodulator", and assigned to the same assignee. The demodulated data at the input terminal 10 is generally in the form of a stream of data pulses having specific switching points defining the data pulses. As is well known in the art, the original stream of data is composed of pulses representing "1's" and "0's" and these pulses are formed by the specific switching of digital circuitry. The pulses are generally distorted during transmission and the switching points may not be readily detectable. Further, it is generally necessary to reconstruct the steam of data into a more useable stream of data pulses and this reconstruction requires a clock synchronized to the data, or the original clock in the digital circuitry that produced the data.

The stream of data from the terminal 10 is low pass filtered in a filter 12 to remove noise and the like. The filtered stream of data is supplied to a circuit 15 designed to convert the stream of data to a stream of unidirectional pulses. In the present embodiment the circuit 15 includes an absolute value detector, many types of which are commercially available. The circuit 15 might also include any of a variety of square law devices. It will of course be understood by those skilled in the art that in the event the filtered stream of data is a stream of unidirectional pulses the circuit 15 is not required. The stream of unidirectional pulses from the circuit 15 is supplied to first inputs of a pair of multipliers 20 and 21.

A source of clock pulses 25, which includes a clock operating at the switching frequency of the demodulated data at terminal 10 (the frequency of the clock which produced the original digital data) and a hybrid or phase splitting circuit, provides an in-phase clock signal on a first line 26 and a 90° phase shifted clock signal on a second line 27. The line 26 carrying the in-phase clock pulses is connected to a second input of the multiplier 20 and to an input of another multiplier 30. The line 27 carrying the 90° phase shifted clock pulses is connected to a second input of the multiplier 21 and to an input of another multiplier 31. The outputs of the multipliers 20 and 21 are connected through low pass filters 35 and 36, respectively, to second inputs of the multipliers 31 and 30, respectively. The output of the multiplier 31 is negatively added (subtracted) to the output of the multiplier 30 in a combining circuit 40 and the output is connected to the clock input of a latch circuit 45. The filtered data stream from the filter 12 is connected through the circuit 15 to the data input of the latch 45 and the output of the latch 45 is supplied to a data output terminal 46.

In the operation of the present circuit, the clock 25 provides a stream of clock pulses which have some phase error, $\phi$, with respect to the stream of data at the terminal 10 (or the clock which produces the original data). The in-phase and 90° shifted, or quadrature, clock pulses on the lines 26 and 27 can be represented as follows.

in-phase clock pulses $= \sin \omega_o t$ quadrature-phase clock pulses $= \cos \omega_o t$ The stream of data from the circuit 15 can represented by the following relationship.

Data stream $= \sin (\omega_o t + \phi)$

In this relationship the angle $\phi$ is the phase error between the clock 25 and the data stream at the terminal 10. After the data stream and the in-phase clock pulses are multiplied in the multiplier 20 and filtered in the low pass filter 25, the output from the filter 35 will be generally in the form of the cosine of the phase error angle $\phi$ plus some small amount of noise. After the data stream and the quadrature phase clock pulses are multiplied in the multiplier 21 and filtered in the low pass filter 36, the output will be generally in the form of the sine of the phase error angle $\phi$ plus some small amount of noise. The output signals from the filters 35 and 36 are then cross multiplied by the signals from the clock 25 in the mutlipliers 30 and 31 to provide, respectively, the following output signals.

$$\text{Mult. } 30 = \sin\phi \sin\omega_o t$$

$$\text{Mult. } 31 = \cos\phi \cos\omega_o t$$

When these two output signals are combined in the circuit 40 the output signal is generally in accordance with the following equation.

$$\cos\phi \cos\omega_o t - \sin\phi \sin\omega_o t = \cos(\omega_o t + \phi)$$

This output signal is applied to the clock input of the latch or sampling circuit 45.

The latch or sampling circuit 45 is any circuit which will sample the input data each time a clock signal is applied to the clock input. Typically, the latch 45 will be a clocked flip-flop and this flip-flop may be constructed to operate on any desired portion of the clock signal, e.g. the leading edge, the peak, the trailing edge, etc. It is only essential that the latch 45 operate in a consistent fashion with respect to the input data sream. In this embodiment the signal applied to the clock input of the latch 45 is 90 electrical degrees out of phase with the data stream supplied from the filter 12 but the latch 45 can be operated at the desired portion of each input data pulse, e.g. the zero crossings, leading edge, peak, trailing edge, etc., in a variety of ways. For example, the portion of the clock pulse at which the latch 45 toggles, or switches, can be selected to provide the desired result, the output signal from the combining circuit 40 can be shifted 90 electrical degrees, or the data from the filter 25 can be shifted 90 electrical degrees. The exact electrical relationship is not critical as long as the latch 45 switches consistently at the same known point or points with respect to pulses in the input data stream.

Thus, the synchronizing circuit disclosed senses the incoming data and rapidly adjusts the phase of the clock signal. The synchronized clock signal is fed forward to detect the data. This technique provides a substantial improvement in acquisition time over, for example, phase locked loops which cannot be made to acquire rapidly with 100 percent certainty because of the quasi stable lock point at 180°. In the present circuit the acquisition time is dictated by the response time of the low pass filters 35 and 36, which filters are designed to maximize the signal to noise ratio while minimizing the acquisition time. While these requirements are in direct opposition in the design of a low pass filter circuit, the small amount of noise that passes through the low pass filters 35 and 36 will generally be ineffective to toggle the latch circuit 45. The acquisition time and signal to noise ratio are parameters which are dictated by specific applications and the remainder of the circuit. However, the open loop feed forward phase correction described herein can generally achieve an acquisition time of 10 to 20 clock pulse times.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. In a system adapted to receive a stream of data having specific switching points defining the data, a clock synchronizer and data detector comprising:
   (a) a source of clock pulses having first and second outputs with first and second reference signals available at the outputs, respectively, said reference signals being separated in phase by a predetermined number of electrical degrees;
   (b) first multiplying means connected to multiply the received stream of data by each of the first and second reference signals and provide first and second products;
   (c) low pass filter means connected to receive the two products from said first multiplying means and substantially reduce the noise content therein;
   (d) second multiplying means connected to receive the filtered first and second products from said filter means and the first and second reference signals from said clock source for multiplying the first product by the second reference signal and the second product by the first reference signal and providing a pair of products;
   (e) combining means connected to receive the pair of products from said second multiplying means for combining the products into a single stream of clock pulses having a predetermined phase relationship with respect to the switching points of the stream of data; and
   (f) sampling means connected to receive the stream of data and the stream of clock pulses from said combining means for sampling the data approximately at each of the switching points in response to the stream of clock pulses.

2. A clock synchronizer and data detector as claimed in claim 1 wherein the sampling means includes a clocked flip-flop.

3. In a system adapted to receive data generally in the form of a stream of pulses having specific switching points defining the data, a clock synchronizer and data detector comprising:
   (a) a source of clock pulses having first and second outputs with first and second reference signals available at the outputs, respectively, said reference signals having a 90° electrical phase separation;
   (b) a first pair of multipliers connected to multiply the received stream of pulses by each of the first and second reference signals and provide first and second products;
   (c) low pass filter means connected to receive the two products from said first pair of multipliers and substantially reduce the noise content therein;
   (d) a second pair of multipliers connected to receive the filtered first and second products from said filter means and the first and second reference signals from said clock source for multiplying the first product by the second reference signal and the second product by the first reference signal and providing a pair of products at outputs thereof;
  (e) combining means connected to receive the pair of products from said second pair of multipliers for combining the products into a single stream of clock pulses in-phase with the switching points of the data received; and
  (f) sampling means connected to receive the stream of data and the stream of clock pulses from said combining means for sampling the data at each of the switching points in response to the stream of clock pulses.

4. In a system adapted to receive a stream of data having specific switching points defining the data, a clock synchronizer and data detector comprising:
  (a) input means connected to receive the stream of data for converting the data to an output signal having unidirectional pulses;
  (b) a source of clock pulses having first and second outputs with first and second reference signals available at the outputs, respectively, said reference signal having a 90° electrical phase separation;
  (c) a first pair of multipliers connected to multiply the output signal from said input means by each of the first and second reference signals and provide first and second products at two outputs;
  (d) low pass filter means connected to receive the two products from said first pair of multipliers and substantially reduce the noise content therein;
  (e) a second pair of multipliers connected to receive the filtered first and second products from said filter means and the first and second reference signals from said clock source for multiplying the first product by the second reference signal and the second product by the first reference signal and providing a pair of products at outputs thereof;
  (f) combining means connected to receive the pair of products from said second pair of multipliers for combining the products into a single stream of clock pulses in-phase with the switching points of the data received; and
  (g) sampling means connected to receive the stream of data and the stream of clock pulses from said combining means for sampling the data at each of the switching points in response to the stream of clock pulses.

5. A clock synchronizer and data detector as claimed in claim 4 wherein the input means includes an absolute value determining circuit.

6. A clock synchronizer and data detector as claimed in claim 5 wherein the absolute value determining circuit includes a square law detector.

7. A clock synchronizer and data detector as claimed in claim 4 wherein the sampling means includes a clocked flip-flop.

8. A method of detecting a stream of data having specific switching points defining the data, said method comprising the steps of:
  (a) providing first and second streams of clock pulses separated in phase by a predetermined number of electrical degrees;
  (b) multiplying the stream of data by each of the first and second streams of clock pulses to produce first and second products;
  (c) filtering the products to substantially reduce the noise;
  (d) multiplying the filtered first and second products by the second and first streams of clock pulses to provide a pair of final products;
  (e) combining the final products to provide a single stream of clock pulses having a predetermined phase relationship with respect to the switching points of the stream of data; and
  (f) sampling the stream of data in response to the single stream of clock pulses.

9. A method according to claim 8 wherein the streams of clock pulses are separated in phase by ninety electrical degrees.

10. A method according to claim 8 wherein the sampling is performed during the clock pulses and approximately at the switching points of the stream of data.

* * * * *